(12) United States Patent
Ahn et al.

(10) Patent No.: US 8,804,304 B2
(45) Date of Patent: *Aug. 12, 2014

(54) CHIP TYPE LAMINATED CAPACITOR

(71) Applicant: Samsung Electro-Mechanics Co., LTD., Gyunggi-do (KR)

(72) Inventors: Young Ghyu Ahn, Gyunggi-do (KR); Byoung Hwa Lee, Gyunggi-do (KR); Min Cheol Park, Gyunggi-do (KR); Young Hoon Song, Gyunggi-do (KR); Mi Hee Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,335

(22) Filed: Jan. 29, 2013

(65) Prior Publication Data

US 2013/0208400 A1    Aug. 15, 2013

Related U.S. Application Data

(63) Continuation of application No. 13/529,766, filed on Jun. 21, 2012, now Pat. No. 8,385,048.

(30) Foreign Application Priority Data

Jun. 23, 2011    (KR) .................. 10-2011-0061344

(51) Int. Cl.
*H01G 4/06*    (2006.01)
(52) U.S. Cl.
USPC .................. 361/321.1; 361/321.2; 361/306.1; 361/306.3; 361/303; 361/305

(58) Field of Classification Search
USPC ........... 361/321.1, 321.2, 303–305, 311–313, 361/306.1, 306.3, 301.4
See application file for complete search history.

(56) References Cited

U.S. PATENT DOCUMENTS 6,052,272 A    4/2000   Kuroda et al.
6,519,134 B1   2/2003   Li et al.

(Continued)

FOREIGN PATENT DOCUMENTS

JP    60-20135 U     2/1985
JP    3-122525 U    12/1991

(Continued)

OTHER PUBLICATIONS

Japanese Office Action issued in Japanese Patent Application No. 2012-140830 dated May 13, 2014, with English Translation.

*Primary Examiner* — Nguyen T Ha
(74) *Attorney, Agent, or Firm* — McDermott Will & Emery LLP

(57) ABSTRACT

There is provided a chip type laminated capacitor, including: a ceramic body including a dielectric layer having a thickness equal to 10 or more times an average particle diameter of a grain included therein and being 3 □m or less; first and second outer electrodes formed on both ends of the ceramic body in a length direction; first and second band parts formed to extend inwardly of the ceramic body in the length direction on a length-width (L-W) plane from the first and second outer electrodes and having different lengths; and third and fourth band parts formed to extend inwardly of the ceramic body in the length direction on a length-thickness (L-T) plane from the first and second outer electrodes and having different lengths.

6 Claims, 5 Drawing Sheets

(56) References Cited

U.S. PATENT DOCUMENTS

| | | |
|---|---|---|
| 6,970,341 B1 | 11/2005 | Devoe et al. |
| 7,035,079 B1 | 4/2006 | Park et al. |
| 7,433,172 B2 | 10/2008 | Togashi |
| 7,688,568 B1 | 3/2010 | Lee et al. |
| 8,385,048 B2 * | 2/2013 | Ahn et al. .................. 361/321.1 |

FOREIGN PATENT DOCUMENTS

| | | |
|---|---|---|
| JP | 4-15824 U | 2/1992 |
| JP | 09-153430 A | 6/1997 |
| JP | 09-260204 A | 10/1997 |
| JP | 2007-258477 A | 10/2007 |

* cited by examiner

CHIP TYPE LAMINATED CAPACITOR

CROSS-REFERENCE TO RELATED APPLICATIONS

This application is a continuation of U.S. application Ser. No. 13/529,766, filed on Jun. 21, 2012, now U.S. Pat. No. 8,385,048, which claims the priority of Korean Patent Application No. 10-2011-0061344 filed on Jun. 23, 2011, in the Korean Intellectual Property Office, the disclosure of which is incorporated herein by reference.

BACKGROUND OF THE INVENTION

1. Field of the Invention

The present invention relates to a chip type laminated capacitor capable of reducing acoustic noise generated between inner electrodes at the time power is applied thereto while being miniaturized and having high capacitance.

2. Description of the Related Art

With the trend toward small-sized and multi-functional electronics, the demand for a compact, high-capacitance chip type laminated capacitors embedded in electronics has also increased.

In order to reduce the size of a chip type laminated capacitor and increase the capacitance thereof, there is a need to use a material having high dielectric permittivity, for example, barium titanate, as a ceramic material forming a dielectric layer. When AC and DC voltages are applied to the chip type laminated capacitor including the dielectric layer made of a material having high dielectric permittivity, a piezoelectric phenomenon is generated between inner electrodes and vibrations are generated.

These vibrations may be excessive in the case that the permittivity of the dielectric layer is high and the size of a chip is relatively large, based on the same capacitance. The vibrations are transferred from an outer electrode of the chip type laminated capacitor to a circuit board on which the chip type laminated capacitor is mounted. In this case, the circuit board is vibrated to generate resonance.

That is, when the resonance generated by the vibrations of the circuit board is in a range of an audible frequency (20 to 20,000 Hz), the sound of the vibrations in the circuit board may give a person an unpleasant feeling, and here, the vibration sound is referred to as acoustic noise.

Acoustic noise generated due to a piezoelectric phenomenon in a laminated ceramic capacitor using a ferroelectric material may cause serious defects in some electronic devices.

Acoustic noise may be a factor in noise generation in electronic devices equipped with the laminated ceramic capacitor.

SUMMARY OF THE INVENTION

An aspect of the present invention provides a chip type laminated capacitor having reduced acoustic noise, even in a case a dielectric permittivity and a thickness of a dielectric layer has been significantly reduced.

According to an embodiment of the present invention, there is provided a chip type laminated capacitor, including: a ceramic body including a dielectric layer having a thickness equal to 10 or more times an average particle diameter of a grain included therein and being 3 µm or less; first and second outer electrodes formed on both ends of the ceramic body in a length direction; first and second band parts formed to extend inwardly in the length direction on a length-width (L-W) plane of the ceramic body from the first and second outer electrodes, respectively, the first and second band parts having different lengths; and third and fourth band parts formed to extend inwardly in the length direction on a length-thickness (L-T) plane of the ceramic body from the first and second outer electrodes, respectively, third and fourth band parts having different lengths.

Fifth and sixth band parts are formed on a surface of the ceramic body, opposed to one surface thereof in a lamination direction, the one surface having the first and second band parts formed thereon, seventh and eighth band parts are formed on a surface of the ceramic body, opposed to one surface thereof in a width direction, the one surface having the third and fourth band parts formed thereon, and the first to eighth band parts may satisfy at least one of the following conditions (1), (2), (3), and (4).

$$3\% \leq B\text{Wave1}/L \leq 40\% \quad (1)$$

$$3\% \leq B\text{Wave2}/L \leq 40\% \quad (2)$$

$$3\% \leq B\text{Wave3}/L \leq 40\% \quad (3), \text{and}$$

$$3\% \leq B\text{Wave4}/L \leq 40\% \quad (4)$$

where BWave1 represents an average value of lengths A1 and A2 of the first and second band parts, BWave1=(A1+A2)/2, BWave2 represents an average value of lengths B1 and B2 of the third and fourth band parts, BWave2=(B1+B2)/2, BWave3 represents an average value of lengths C1 and C2 of the fifth and sixth band parts, BWave3=(C1+C2)/2, and BWave4 represents an average value of lengths D1 and D2 of the seventh and eighth band parts, BWave4=(D1+D2)/2, and A1 represents a length of the first band part, A2 represents a length of the second band part, B1 represents a length of the third band part, B2 represents a length of the fourth band part, C1 represents a length of the fifth band part, C2 represents a length of the sixth band part, D1 represents a length of the seventh band part, and D2 represents a length of the eighth band part.

An absolute value of a difference between the lengths of the band parts on one surface of the ceramic body and the BWave1 to the BWave4 may satisfy at least one of the following conditions (5) to (8).

$$5\% \leq |A1-A2|/B\text{Wave1} \leq 20\% \quad (5)$$

$$5\% \leq |B1-B2|/B\text{Wave2} \leq 20\% \quad (6)$$

$$5\% \leq |C1-C2|/B\text{Wave3} \leq 20\% \quad (7), \text{and}$$

$$5\% \leq |D1-D2|/B\text{Wave4} \leq 20\% \quad (8)$$

where A1 represents the length of the first band part, A2 represents the length of the second band part, B1 represents the length of the third band part, B2 represents the length of the fourth band part, C1 represents the length of the fifth band part, C2 represents the length of the sixth band part, D1 represents the length of the seventh band part, and D2 represents the length of the eighth band part, wherein C1≠C2 and D1≠D2.

According to another embodiment of the present invention, there is provided a chip type laminated capacitor, including: first and second outer electrodes formed on both ends of a ceramic body in a length direction, the ceramic body having a hexahedral shape; and first to eighth band parts extending inwardly in the length direction of the ceramic body from the first and second outer electrodes, first to eighth band parts being formed to be opposed to each other on a first surface and a third surface in a length-width (L-W) plane and on a second surface and a fourth surface in a length-thickness (L-T) plane, respectively, wherein lengths of the band parts formed on at least one of the first surface to the fourth surface are different from each other, and a length of one band part on at least one of the first surface to the fourth surface is different from that of another band part having the same polarity as the one band part and being formed on another surface continued to a surface on which the one band part is formed.

The first band part formed on the first surface and the third band part formed on the second surface may have different lengths.

Lengths of the band parts having the same polarity and being formed on surfaces opposed to each other may be different from each other.

Heights of the band parts opposed to each other on the same surface of the ceramic body may be different each other The dielectric layer may have a thickness of 3 μm or less and may be equal to 10 or more times an average particle diameter of a grain within the dielectric layer.

The first to eighth band parts may satisfy at least one of the following conditions (1), (2), (3), and (4).

$$3\% \leq B\text{Wave1}/L \leq 40\% \quad (1)$$

$$3\% \leq B\text{Wave2}/L \leq 40\% \quad (2)$$

$$3\% \leq B\text{Wave3}/L \leq 40\% \quad (3), \text{and}$$

$$3\% \leq B\text{Wave4}/L \leq 40\% \quad (4)$$

where BWave1 represents an average value of lengths of the first and second band parts, BWave1=(A1+A2)/2, BWave2 represents an average value of lengths of the third and fourth band parts, BWave2=(B1+B2)/2, BWave3 represents an average value of lengths of the fifth and sixth band parts, BWave3=(C1+C2)/2, and BWave4 represents an average value of lengths of the seventh and eighth band parts, BWave4=(D1+D2)/2, and A1 represents a length of the first band part, A2 represents a length of the second band part, B1 represents a length of the third band part, B2 represents a length of the fourth band part, C1 represents a length of the fifth band part, C2 represents a length of the sixth band part, D1 represents a length of the seventh band part, and D2 represents a length of the eighth band part.

An absolute value of a difference between the lengths of the band parts on one surface of the ceramic body and the BWave1 to the BWave4 may satisfy at least one of the following conditions (5) to (8).

$$5\% \leq |A1-A2|/B\text{Wave1} \leq 20\% \quad (5)$$

$$5\% \leq |B1-B2|/B\text{Wave2} \leq 20\% \quad (6)$$

$$5\% \leq |C1-C2|/B\text{Wave3} \leq 20\% \quad (7), \text{and}$$

$$5\% \leq |D1-D2|/B\text{Wave4} \leq 20\% \quad (8)$$

where A1 represents the length of the first band part, A2 represents the length of the second band part, B1 represents the length of the third band part, B2 represents the length of the fourth band part, C1 represents the length of the fifth band part, C2 represents the length of the sixth band part, D1 represents the length of the seventh band part, and D2 represents the length of the eighth band part, wherein C1≠C2 and D1≠D2.

According to another embodiment of the present invention, there is provided a chip type laminated capacitor, including: a ceramic body including first and second inner electrodes, having a dielectric layer having a thickness of 3 μm or less disposed therebetween; a first outer electrode formed on one end of the ceramic body in a length direction and connected to the first inner electrode, the first outer electrode including: a first band part formed on a first surface of the ceramic body; a third band part formed on a second surface of the ceramic body; a fifth band part formed on a third surface of the ceramic body opposed to the first surface thereof; and a seventh band part formed on a fourth surface of the ceramic body opposed to the second surface thereof; and a second outer electrode formed on another end of the ceramic body in the length direction and connected to the second inner electrode, the second outer electrode including: a second band part formed on the first surface of the ceramic body; a fourth band part formed on the second surface of the ceramic body; a sixth band part formed on the third surface of the ceramic body; and an eighth band part formed on the fourth surface of the ceramic body, wherein the number of grains disposed between the first and second inner electrodes is 10 or more in a thickness direction of the dielectric layer, lengths of the band parts formed on at least one of the first surface to the fourth surface are different from each other, and the first to eighth band parts satisfy at least one of the following conditions (1), (2), (3), and (4).

$$3\% \leq B\text{Wave1}/L \leq 40\% \quad (1)$$

$$3\% \leq B\text{Wave2}/L \leq 40\% \quad (2)$$

$$3\% \leq B\text{Wave3}/L \leq 40\% \quad (3), \text{and}$$

$$3\% \leq B\text{Wave4}/L \leq 40\% \quad (4)$$

where BWave1 represents an average value of length of the first and second band parts, BWave1=(A1+A2)/2, BWave2 represents an average value of length of the third and fourth band parts, BWave2=(B1+B2)/2, BWave3 represents an average value of length of the fifth and sixth band parts, BWave3=(C1+C2)/2, and BWave4 represents an average value of length of the seventh and eighth band parts, BWave4=(D1+D2)/2.

An absolute value of a difference between the lengths of the band parts on one surface of the ceramic body and the BWave1 to the BWave4 may satisfy at least one of the following conditions (5) to (8).

$$5\% \leq |A1-A2|/B\text{Wave1} \leq 20\% \quad (5)$$

$$5\% \le |B1-B2|/B\text{Wave}2 \le 20\% \tag{6}$$

$$5\% \le |C1-C2|/B\text{Wave}3 \le 20\% \tag{7, and}$$

$$5\% \le |D1-D2|/B\text{Wave}4 \le 20\% \tag{8}$$

A1 represents a length of the first band part, A2 represents a length of the second band part, B1 represents a length of the third band part, B2 represents a length of the fourth band part, C1 represents a length of the fifth band part, C2 represents a length of the sixth band part, D1 represents a length of the seventh band part, and D2 represents a length of the eighth band part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
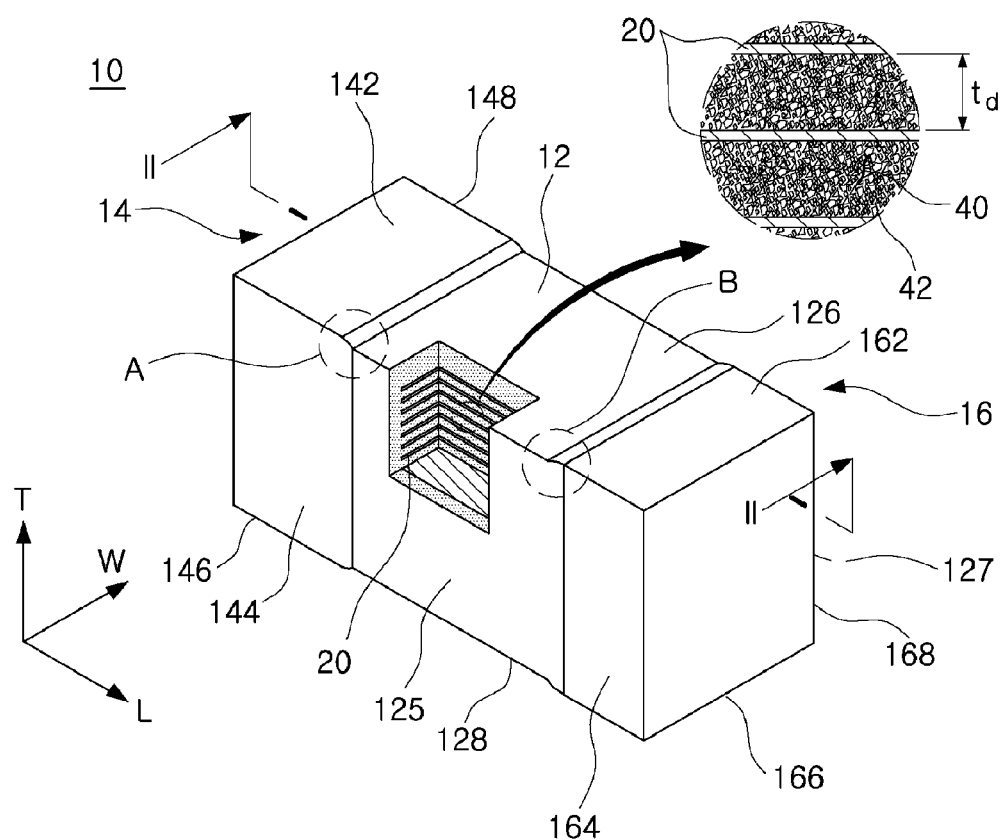
FIG. 1 is a partially cut-away perspective view schematically showing a chip type laminated capacitor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention Further, like reference numerals will be used to designate like components having similar functions throughout the drawings within the scope of the present invention.

Chip Type Laminated Ceramic Capacitor

Figure 2:
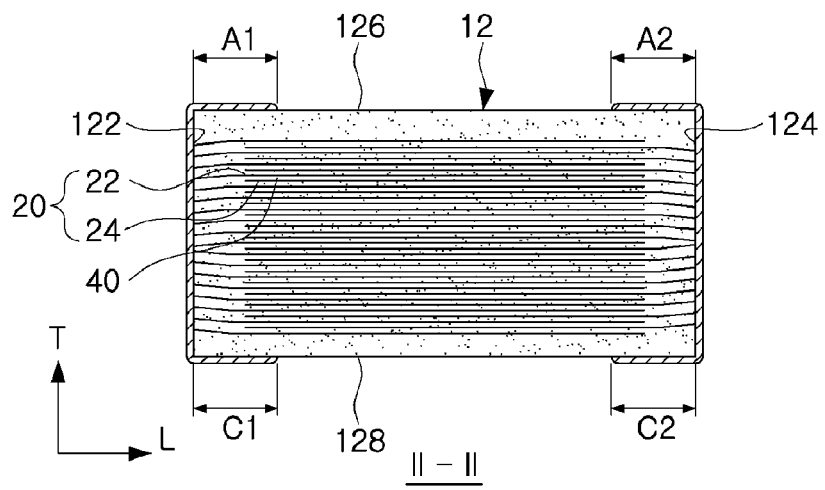
FIG. 2 is a schematic cross-sectional view of the chip type laminated capacitor, taken along line II-II' of FIG. 1.
Figure 3A:
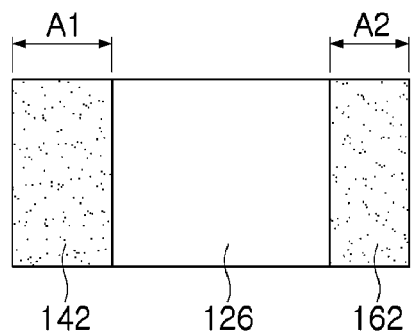
FIGS. 3A to 3D are schematic plan views, respectively showing a length of a band part of an outer electrode formed on an outer surface of the chip type laminated capacitor of FIG. 1.
Figure 3B:
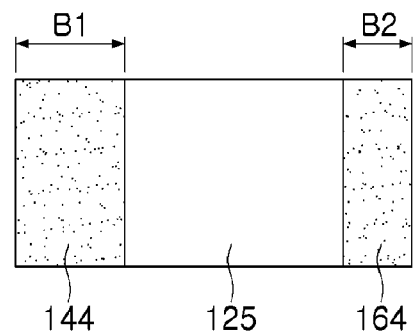
Figure 3C:
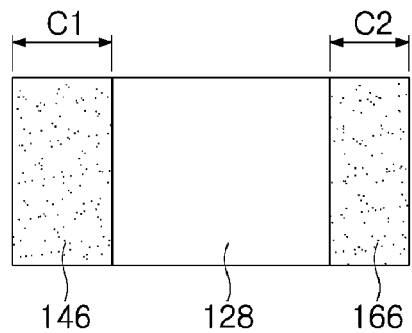
Figure 3D:
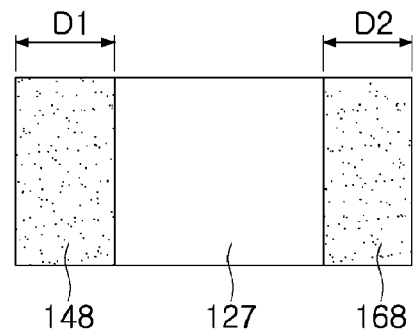

FIG. 1 is a partially cut-away perspective view schematically showing a chip type laminated capacitor according to an embodiment of the present invention. FIG. 2 is a schematic cross-sectional view of the chip type laminated capacitor, taken along line II-II' of FIG. 1. FIGS. 3A to 3D are schematic plan views, respectively showing a length of a band part of an outer electrode formed on an outer surface of the chip type laminated capacitor of FIG. 1.

Referring to FIGS. 1 to 3, a chip type laminated capacitor 10 may include a ceramic body 12, first and second outer electrodes 14 and 16, and band parts 142, 144, 146, 148, 162, 164, 166, and 168.

A conductive paste is applied to a ceramic green sheet so as to form inner electrodes 20 on the ceramic green sheet, and several sheets of the ceramic green sheet having the inner electrodes 20 formed thereon are laminated and then fired, whereby the ceramic body 12 may be manufactured. The ceramic body 12 may be formed by repeatedly laminating a plurality of dielectric layers 40 and the inner electrodes 20.

The ceramic body 12 may be formed to have a hexahedral shape. Due to firing shrinkage in ceramic powder during the firing of a chip, the ceramic body 12 may do not have the hexahedral shape formed by completely straight lines, but may substantially have the hexahedral shape.

In order to explain embodiments of the present invention more clearly, defining directions of the hexahedron, a 'length direction' may be defined as an 'L' direction shown in FIG. 1. In addition, a 'width direction' may be defined as a 'W' direction and a 'thickness direction' may be defined as a 'T' direction. Here, the 'thickness direction' may have the same conception as a direction of stacked dielectric layers, that is, a 'lamination direction.'

In the embodiment of FIG. 1, the chip type laminated capacitor 10 having a rectangular parallelepiped shape in which a length is longer than a width and a thickness is provided.

As a material forming the dielectric layers 40, ceramic powder having high dielectric permittivity may be used so as to implement high capacitance. As the ceramic powder, for example, a barium titanate ($BaTiO_3$) based powder, a strontium titanate ($SrTiO_3$) based powder, or the like, may be used but is not limited thereto.

In addition, when a ferroelectric ceramic powder having a small average particle diameter is fired and then, a grain size thereof is reduced, the dielectric permittivity of a ferroelectric may be reduced. The embodiment of the present invention may not be limited due to the permittivity of the dielectric layers 40.

In the embodiment of the present invention, each dielectric layer 40 has a thickness td equal to or less than 3 μm, and an average particle diameter of each of ceramic grains 42 forming each dielectric layer 40 may be equal to or less than 0.3 μm. That is, each dielectric layer 40 of the fired chip type laminated capacitor 10 may have a thickness 10 times or more than the average particle diameter of each grain 42 included therein.

In this case, the thickness td of the dielectric layer 40 may refer to an average thickness of the single dielectric layer 40 which is disposed between the inner electrodes 20.

The thickness of the dielectric layer 40 may be measured from an image obtained by scanning a cross section of the ceramic body 12 in length direction using a scanning electron microscope (SEM), as shown in FIG. 2. As shown in FIG. 2, for example, the average thickness may be acquired by measuring thicknesses of any one dielectric layer 40 in 30 positions in the length direction thereof, the 30 positions being located at equal intervals, from an extracted image of the dielectric layer 40 obtained by scanning a cross-section taken in a length-thickness direction (L-T) at the center of the ceramic body 12 in the width direction (W), through the SEM, and then averaging the values of the measured thicknesses. The 30 positions located at equal intervals may be determined in a capacitance formation part referring to a region on which the first and second internal electrodes 22 and 24 are overlapped. In addition, in a case in which the measurement of an average value is executed with respect to ten or more dielectric layers 40, the average thickness of each of the dielectric layers 40 may be more generalized.

In addition, the average thickness of the dielectric layer 40 may also be measured from an image obtained by scanning a cross section taken in a width and thickness direction W-T of the ceramic body 12 at the center thereof in the length direction, through the SEM.

In this case, the center of the ceramic body 12 in the width direction (W) or the length direction (L) thereof may be defined as a point within a range of 30% of the width or the length of the ceramic body 12 from the center of the ceramic body 12 in the width direction (W) or the length direction (L).

Meanwhile, the average size of each of grains 42 included in the dielectric layer 40 may be measured by analyzing a cross sectional photograph of the dielectric layer 40 extracted through the SEM. For example, the average size of each of grains 42 included in the dielectric layer 40 may be measured by using grain size measurement software that supports an average grain size standard measurement method defined in American Society for Testing and Materials (ASTM) E112.

In this case, the central portion of the width direction W or the length direction L of the ceramic body 12 may be defined as a point within a range of 30% of the width or the length of the laminated body from the center point of the width direction W or the length direction L of the ceramic body 12.

Meanwhile, an average size of the grain 42 of the dielectric layer 40 may be measured by analyzing a cross section photograph of the dielectric layer extracted by the scanning electron microscope (SEM). For example, the average size of the grain 42 of the dielectric layer 40 may be measured by using grain size measurement software that supports the average size standard measurement method of the grain defined in American Society for Testing and Materials (ASTM) E112.

According to the embodiment of the present invention, the ceramic permittivity may be reduced by reducing the average size of the grain 42. Further, a great number of dielectric layers 40 may be laminated in the same size of chip by setting the thickness of each dielectric layer 40 to be 3 μm or less. Therefore, the high capacitance may be implemented in the small-sized chip.

The inner electrode 20 may include the first inner electrode 22 and the second inner electrode 24, and each of the first and second inner electrodes 22 and 24 may be electrically connected to the first and second outer electrodes 14 and 16.

Meanwhile, in order to reduce acoustic noise, low dielectric permittivity may be implemented by reducing the average size of the grain 42 within the dielectric layer 40 while reducing the thickness td of the dielectric layer 40.

As described above, when the low dielectric permittivity of the laminated ceramic capacitor 10 is implemented by reducing the thickness td of the dielectric layer 40 and the average size of the grain, acoustic noise may be reduced.

However, a reduction in acoustic noise is remarkably reduced in the laminated ceramic capacitor 10 manufactured in such a manner that a distance between the first and second inner electrodes 20 and 22 within the ceramic body 12, that is, the thickness of the dielectric layer 40 is set to be 3 μm or less and the number of grains within the dielectric layer 40 is 10 or more.

This can be more clearly appreciated from the following Table 1.

TABLE 1

| No | Dielectric Thickness (td, μm) | Grain Size (Dc, μm) | td/Dc | Acoustic noise (dB) |
|---|---|---|---|---|
| 1  | 4.3 | 0.68 | 6.3  | 43.7 |
| 2  |     | 0.58 | 7.4  | 43.1 |
| 3  |     | 0.43 | 10.0 | 36.3 |
| 4  |     | 0.26 | 16.5 | 33.1 |
| 5  | 2.8 | 0.59 | 4.7  | 43.2 |
| 6  |     | 0.45 | 6.2  | 42.1 |
| 7  |     | 0.26 | 10.8 | 41.0 |
| 8  |     | 0.16 | 17.5 | 40.5 |
| 9  | 1.9 | 0.60 | 3.2  | 43.6 |
| 10 |     | 0.44 | 4.5  | 42.6 |
| 11 |     | 0.25 | 7.6  | 41.7 |
| 12 |     | 0.16 | 11.9 | 40.8 |

In this case, samples that are an experimental object were manufactured as follows.

First, a plurality of ceramic green sheets having a thickness required for several experimental conditions were prepared by applying slurries including powder such as barium titanate (BaTiO3), and the like, to carrier films and drying the carrier films having the slurries applied thereto, whereby dielectric layers were formed.

Next, inner electrodes were formed using a conductive paste for a nickel inner electrode on the green sheets through a screen, and then 370 green sheets were laminated and the thickness of a cover layer was differently set to be 10 to 100 μm, whereby a ceramic laminate was manufactured.

The ceramic laminate was subjected to isostatic pressing under a pressure condition of 1,000 kgf/cm$^2$ at 85° C.

The pressed ceramic laminate was cut into individual chips and the cut chips were subjected to a debinder-treatment while being maintained at 230° C. for 60 hours in atmosphere. Thereafter, the chips were fired at 1200° C. in a reduction atmosphere under an oxygen partial pressure of $10^{-11}$ atm to $10^{-10}$ atm lower than a Ni/NiO balance oxygen partial pressure such that the inner electrodes are not oxidized. After firing, the size of the chips was 3.2 mm×1.6 mm×1.6 mm (L×W×T), and the thickness td of the dielectric layer and the grain size thereof were shown in the above Table 1.

Referring to Table 1, when low dielectric permittivity is implemented by reducing the grain size under conditions in which the dielectric thickness is 4.4 μm as in samples 1 to 4, it could be appreciated that magnitude in acoustic noise is remarkably reduced. However, when low dielectric permittivity is implemented by reducing the grain size under conditions in which the dielectric thickness is about 3 μm or less as in samples 5 to 12, it could be appreciated that a reduction in acoustic noise is insignificant even in a case in which td/Dc, that is, a ratio of the grain size to the dielectric thickness is 1/10 or less.

Therefore, when the dielectric thickness is small, it could be appreciated that a reduction effect in acoustic noise may be further increased only in the case of adding separate conditions in addition to a reduction in the grain size.

According to the embodiment of the present invention, as shown in FIG. 3, the first and second outer electrodes 14 and 16 formed on both ends of the ceramic body 12 in the length direction may include first to eighth band parts.

The first and second outer electrodes 14 and 16 may be formed on both ends of the ceramic body 12 in the length direction, the ceramic body 12 having a rectangular parallelepiped shape. The first and second outer electrodes 14 and 16 may have opposed polarities and may be electrically connected to the first inner electrode 22 and the second inner electrode 24 opposing each other, while having the dielectric layer 40 disposed therebetween.

Referring to FIG. 3, the first band part 142 and the second band part 162 formed on a first surface 126, the third band part 144 and the fourth band part 164 formed on a second surface 125, the fifth band part 146 and the sixth band part 166 formed on a third surface 128, and the seventh band part 148 and the eighth band part 168 formed on a fourth surface 127 are defined.

The first to eighth band parts 142, 144, 146, 148, 162, 164, 166, and 168 may extend inwardly in the length direction (L) from the first and second outer electrodes 14 and 16. The first band part 142 and the second band part 162 formed on the first surface 126 may be opposed to the fifth band part 146 and the sixth band part 166 formed on the third surface 128, respectively, the first surface 126 and the third surface 128 being in a L-W plane of the ceramic body (12). While the third band part 144 and the fourth band part 164 formed on the second surface 125 may be opposed to the seventh band part 148 and the eighth band part 168 formed on the fourth surface 127, respectively, the second surface 125 and the fourth surface 127 being in a L-T plane of the ceramic body (12). In this case, the first surface 126 and the third surface 128 correspond to each other in the lamination direction and the second surface 125 and the fourth surface 127 correspond to each other in the width direction.

Further, the lengths of the band parts 142 and 162 formed on at least one surface 126 of the first to fourth surfaces 126, 125, 127, and 128 may be different from each other.

Further, the lengths of the band parts 142 and 144 formed on another surface 125 continued to at least one surface 126 of the first to fourth surfaces 126, 125, 127, and 128 and having the same polarity as that of at least one surface 126 may be different from each other.

In this case, referring to FIG. 6, a method of measuring lengths A1 and A2 of the band parts 142 and 162 will be described.

Figure 6:
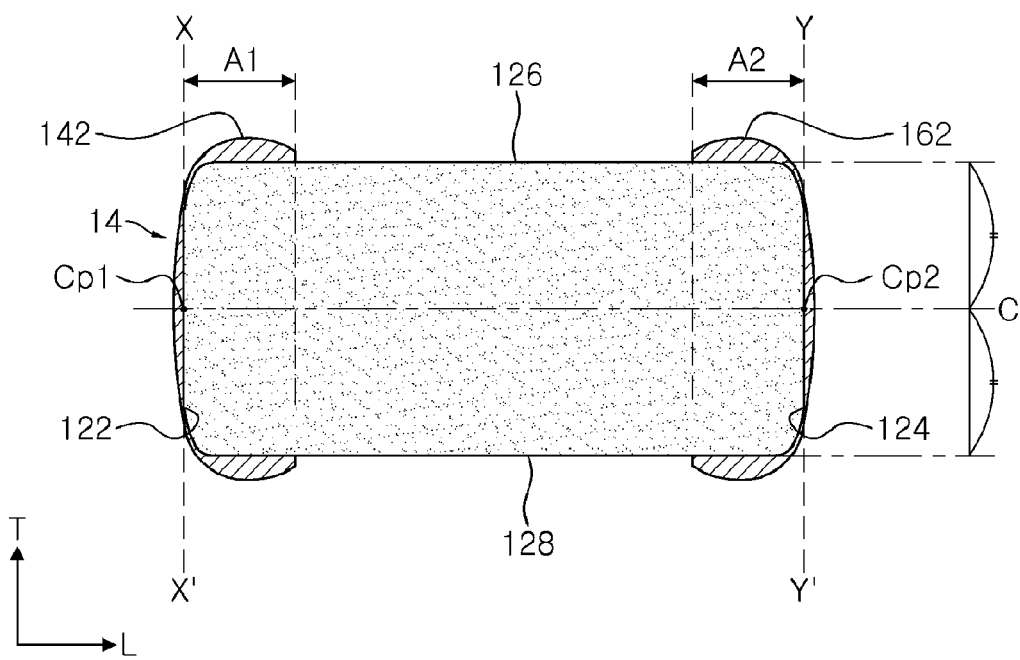
FIG. 6 is a schematic cross-sectional view for measuring the length of the band part of the embodiment the present invention.

FIG. 6 is a cross-sectional view schematically showing a cross section taken in the length and thickness direction (L-T) at the center of the ceramic body 12 in the width direction W, as shown in FIG. 2.

Referring to the cross section taken in the L-T direction of the ceramic body 12, the length A1 of the first band part 142 of the first outer electrode 14 may be defined as a distance from a virtual line xx' vertically extending in a thickness direction from a central line C extending central points Cp1 and Cp2 in a thickness direction of upper and lower end surfaces 126 and 128 of the ceramic body 12 in the thickness direction to the first band part 142.

In addition, the length A2 of the second band part 162 may also be defined as a distance from a virtual line yy' vertically extending in the thickness direction from the central line C to the second band part 162.

In this case, the distances to the first band part 142 and the second band part 162 refer to distances to innermost points of the first and second band parts 142 and 162 formed in the ceramic body 12 in the length direction.

Further, in addition to the first band part 142 and the second band part 162, the lengths of other band parts 144, 146, 148, 164, and 166 may also be measured similar to the above-mentioned method.

The above-mentioned method of measurement is required because it is difficult for each side of the hexahedral exterior of the ceramic body 12 to have accurate straight lines due to a firing process.

In order to reduce acoustic noise while implementing the miniaturization and high capacitance of the capacitor according to the embodiment of the present invention, the first to eighth band parts of the chip type laminated ceramic capacitor 10 may satisfy at least one of the following conditions (1), (2), (3), and (4).

$$3\% \leq B\text{Wave1}/L \leq 40\% \quad (1)$$

$$3\% \leq B\text{Wave2}/L \leq 40\% \quad (2)$$

$$3\% \leq B\text{Wave3}/L \leq 40\% \quad (3), \text{and}$$

$$3\% \leq B\text{Wave4}/L \leq 40\% \quad (4)$$

Where BWave1 may represent the average value of the lengths of the first and second band parts, BWave1=(A1+A2)/2 and BWave2 may represent the average value of the lengths of the third and fourth band parts, BWave2=(B1+B2)/2.

Further, where BWave3 may represent the average value of the lengths of the fifth and sixth band parts, BWave3=(C1+C2)/2 and BWave4 may represent the average value of the lengths of the seventh and eighth band parts, BWave4=(D1+D2)/2.

In addition, where A1 represents the length of the first band part, A2 represents the length of the second band part, B1 represents the length of the third band part, B2 represents the length of the fourth band part, C1 represents the length of the fifth band part, C2 represents the length of the sixth band part, D1 represents the length of the seventh band part, and D2 represents the length of the eighth band part.

When each of the BWave1/L, BWave2/L, BWave3/L, and BWave4/L is below 3%, the adhesion strength of the chip type laminated ceramic capacitor 10 to the circuit board may be degraded to thereby cause mounting defects, and when each of the BWave1/L, BWave2/L, BWave3/L, and BWave4/L exceeds 40%, the both terminals are short-circuited to thereby cause mounting defects when the chip type laminated ceramic capacitor is mounted.

In addition, in the embodiment of the present invention, an absolute value of the difference between lengths of band parts on one surface of the ceramic body 12 and the BWave1 to the BWave4 may satisfy at least one of the following conditions (5) to (8).

$$5\% \leq |A1-A2|/B\text{Wave1} \leq 20\% \qquad (5)$$

$$5\% \leq |B1-B2|/B\text{Wave2} \leq 20\% \qquad (6)$$

$$5\% \leq |C1-C2|/B\text{Wave3} \leq 20\% \qquad (7), \text{and}$$

$$5\% \leq |D1-D2|/B\text{Wave4} \leq 20\% \qquad (8)$$

Where A1 represents the length of the first band part, A2 represents the length of the second band part, B1 represents the length of the third band part, B2 represents the length of the fourth band part, C1 represents the length of the fifth band part, C2 represents the length of the sixth band part, D1 represents the length of the seventh band part, and D2 represents the length of the eighth band part. Here, C1≠C2 and D1≠D2.

The above Equations (5) to (8) regarding the relationship between the absolute value of the difference between lengths of band parts on one surface of the ceramic body 12 and the BWave1 to the BWave4 may be defined as asymmetric rates between the lengths of the band parts.

As the asymmetric rates between the lengths of the band parts are increased, vibrations transferred to the circuit board may be reduced by the imbalance of force, thereby significantly reducing acoustic noise.

When at least one of the asymmetric rates between the lengths of the band parts is below 5%, acoustic noise is very high, and when at least one of the asymmetric rates thereof exceeds 20%, a tombstone mounting defect in which a chip stands up on the circuit board may occur.

Three hundred and seventy green sheets were laminated, whereby a ceramic laminate was manufactured. The ceramic laminate was subjected to isostatic pressing under a pressure condition of 1,000 kgf/cm² at 85° C.

The pressed ceramic laminate was cut into individual chips and the cut chips were subjected to a debinder-treatment while being maintained at 230° C. for 60 hours in atmosphere. Thereafter, the chips were fired at 1200° C. in a reduction atmosphere under an oxygen partial pressure of $10^{-11}$ atm to $10^{-10}$ atm lower than a Ni/NiO balance oxygen partial pressure such that the inner electrodes are not oxidized. After firing, the thickness of the dielectric layer was 2.7 μm and the average size of the grain of the dielectric layer was 0.27 μm, and the chip size 3.2 mm×1.6 mm×1.6 mm (L×W×T).

Next, the laminated ceramic capacitor was manufactured by processes, such as an outer electrode formation process, a plating process, and the like.

In this case, the samples of the laminated ceramic capacitor were variously manufactured according to the asymmetric rates of the band parts of the outer electrode.

The following Tables 2 and 3 are tables in which acoustic noise and a mounting defect rate according to the asymmetric rates of the band parts of the outer electrodes are compared. The noise such as acoustic noise was directly measured in an anechoic chamber by applying a pulse wave of 3 Vpp to DC voltage corresponding to ½ of a rated voltage. Further, the mounting defect rate may be represented by determining the presence and absence of abnormality in the appearance, the adhesion strength, the electrical characteristics, or the like, through the performance of mounting tests on 100 samples.

TABLE 2

| No. | A1 (μm) | A2 (μm) | B1 (μm) | B2 (μm) | C1 (μm) | C2 (μm) | D1 (μm) | D2 (μm) | X1 (%) | X2 (%) | X3 (%) | X4 (%) | Acoustic Noise (dB) | Mounting Defect (%) |
|---|---|---|---|---|---|---|---|---|---|---|---|---|---|---|
| 1* | 57 | 52 | 56 | 52 | 58 | 54 | 55 | 51 | 1.7 | 1.7 | 1.7 | 1.6 | 40.1 | 38 |
| 2 | 101 | 93 | 99 | 91 | 103 | 95 | 101 | 92 | 3.0 | 2.9 | 3.1 | 3.0 | 36.2 | 0 |
| 3 | 374 | 342 | 362 | 333 | 384 | 355 | 361 | 335 | 11.1 | 10.8 | 11.4 | 10.8 | 34.4 | 0 |
| 4 | 775 | 709 | 759 | 700 | 791 | 728 | 762 | 703 | 23.0 | 22.6 | 23.5 | 22.7 | 33.5 | 0 |
| 5 | 1349 | 1236 | 1343 | 1232 | 1355 | 1249 | 1345 | 1231 | 40.0 | 39.9 | 40.3 | 39.9 | 32.2 | 0 |
| 6* | 1532 | 1408 | 1528 | 1398 | 1546 | 1422 | 1530 | 1400 | 45.5 | 45.3 | 45.9 | 45.4 | 32.4 | 52 |

*represents Comparative Examples, A1 to D2 represent the lengths of the first to eighth band parts, X1 represents BWave1/L, X2 represents BWave2/L, X3 represents BWave3/L, and X4 represents BWave4/L. BWave is a function representing the average value of the lengths of the band parts. L represents a distance between the both ends of the ceramic body in the length direction, other than the outer electrodes.

Hereinafter, the embodiment of the present invention will be described in more detail with reference to experimental data of Examples of the present invention and Comparative Examples.

EXPERIMENTAL EXAMPLE

The laminated ceramic capacitor according to Examples of the present invention and Comparative Examples was manufactured as below.

The plurality of ceramic green sheets manufactured to have a thickness of 3.9 μm by applying and drying slurries including powder such as barium titanate ($BaTiO_3$), and the like, to carrier films were prepared.

Next, inner electrodes were formed by applying a conductive paste for a nickel inner electrode to the ceramic green sheets through the use of a screen allowing patterns of which the margin is asymmetric to be formed on each ceramic green sheet.

Samples 1 and 6 are Comparative Examples and Samples 2 to 5 are Examples of the present invention.

In the case of samples 2 to 5 according to the embodiment of the present invention, it could be appreciated that when at least one of the asymmetric rates X1 to X4 of the band parts satisfies a range of 3% to 40%, low acoustic noise of 36 dB or less may be generated and mounting defects are completely removed from the circuit board.

In the case of sample 1 in which the asymmetric rates X1 to X4 of the band parts are below 3%, acoustic noise may be increased to 40 dB or more, and in the case of sample 6 in which the asymmetric rates X1 to X4 of the band parts exceed 40%, acoustic noise is effectively reduced but the mounting defect rate is significantly high.

Consequently, according to the Examples of the present invention, acoustic noise may be significantly reduced and the mounting defect rate may be reduced, as compared with Comparative Examples.

TABLE 3

| No. | A1 (μm) | A2 (μm) | B1 (μm) | B2 (μm) | C1 (μm) | C2 (μm) | D1 (μm) | D2 (μm) | Y1 (μm) | Y2 (μm) | Y3 (μm) | Y4 (μm) | Acoustic Noise (dB) | Mounting Defect (%) |
|---|---|---|---|---|---|---|---|---|---|---|---|---|---|---|
| 1* | 566 | 562 | 558 | 555 | 569 | 563 | 556 | 553 | 0.7 | 0.5 | 1.1 | 0.5 | 41.1 | 0 |
| 2* | 573 | 557 | 564 | 551 | 572 | 559 | 566 | 550 | 2.8 | 2.3 | 2.3 | 2.9 | 40.6 | 0 |
| 3 | 579 | 551 | 570 | 543 | 575 | 548 | 568 | 540 | 5.0 | 4.9 | 4.8 | 5.1 | 34.7 | 0 |
| 4 | 595 | 539 | 588 | 535 | 594 | 538 | 584 | 532 | 9.9 | 9.4 | 9.9 | 9.3 | 33.8 | 0 |
| 5 | 611 | 529 | 6.8 | 520 | 612 | 529 | 610 | 518 | 14.4 | 15.6 | 14.5 | 16.3 | 33.0 | 0 |
| 6 | 626 | 512 | 621 | 507 | 628 | 513 | 622 | 510 | 20.0 | 20.2 | 20.2 | 19.8 | 32.5 | 0 |
| 7* | 645 | 502 | 641 | 498 | 640 | 504 | 648 | 495 | 24.9 | 25.1 | 23.8 | 26.8 | 31.9 | 10 |
| 8* | 680 | 471 | 676 | 466 | 677 | 474 | 672 | 464 | 36.3 | 36.8 | 35.3 | 36.6 | 31.1 | 35 |

*represents Comparative Examples, A1 to D2 represent the lengths of the first to eighth band parts, Y1 represents |A1-A2|/BWave1, Y2 represents |B1-B2|/BWave2, Y3 represents |C1-C2|/BWave3, Y4 represents |D1-D2|/BWave1, and BWave is a function representing the average value of the lengths of the band parts.

Samples 1, 2, 7, and 8 are Comparative Examples and samples 3 to 6 are Examples of the present invention.

In the case of samples 3 to 6 corresponding to the Examples of the present invention, it could be appreciated that when at least one of Y1 to Y4 representing the asymmetric rates of the band parts as the relationship between the absolute value of the difference between the lengths of the band parts and the average of the lengths of the band parts satisfies the range of 5% to 20%, low acoustic noise of 35 dB or less is generated and the mounting defect is completely removed from the circuit board.

In the case of samples 1 and 2 in which the asymmetric rates Y1 to Y4 of the band parts are below 5%, acoustic noise may be increased to 40 dB or more, and in the case of samples 7 and 8 in which the asymmetric rates Y1 to Y4 of the band parts exceed 20%, acoustic noise is effectively reduced but the Tombstone mounting defect rate is significantly high.

Consequently, the Examples of the present invention may remarkably reduce acoustic noise and reduce the risk of the mounting defect rate, as compared with Comparative Examples.

MODIFIED EXAMPLE

Figures 4A, 4B:
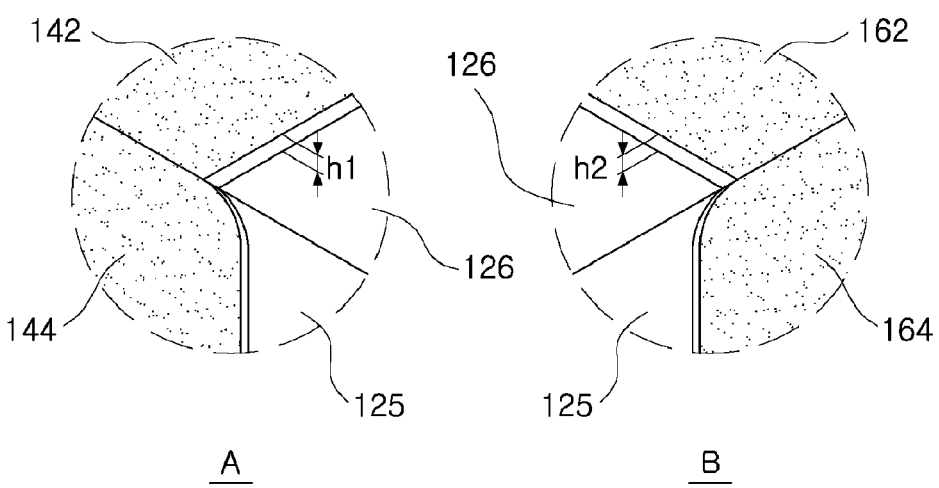
FIGS. 4A and 4B are schematically enlarged perspective views of portions A and B of FIG. 1.
Figure 5:
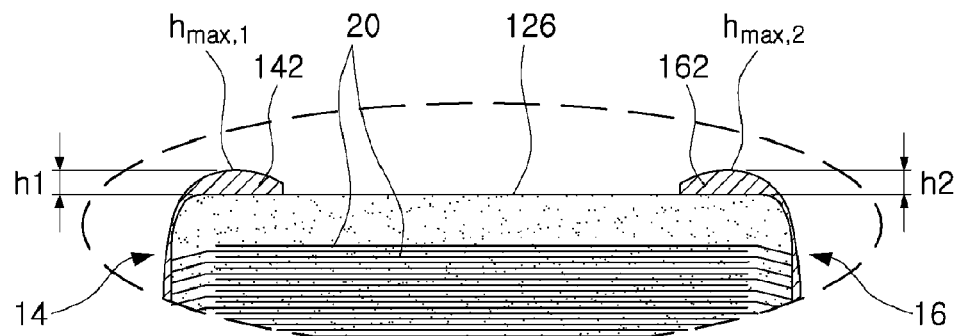
FIG. 5 is a schematically enlarged cross-sectional view of the band part of the outer electrode.

FIGS. 4A and 4B are schematically enlarged perspective views of portions A and B of FIG. 1. FIG. 5 is a schematically enlarged cross-sectional view of the band part of the outer electrode.

In the embodiments of FIGS. 4A and 4B and 5, the difference in height between the band parts 142 and 162 in addition to the difference in length between the band parts 142 and 162 of the outer electrode are set.

As such, the height of the band parts 142 and 162 may be defined by measuring the distance between a virtual line intersecting positions hmax1 and hmax2 at which the band parts of the outer electrode are highest on one surface 126 of the ceramic body 12 and a horizontal line even with the one surface 126.

The imbalance between the heights of the band parts 142 and 162 may allow for a reduction in acoustic noise and may also allow for the reduction in acoustic noise due to the imbalance between the lengths of the band parts 142 and 162 being complementary. As set forth above, with the chip type laminated capacitor and the circuit board having the same mounted thereon according to the embodiments of the present invention, acoustic noise can be significantly reduced even in the small-sized and high-capacitance chip type laminated capacitor, in which the thickness of the dielectric layer is equal to or less than 3 μm.

While the present invention has been shown and described in connection with the embodiments, it will be apparent to those skilled in the art that modifications and variations can be made without departing from the spirit and scope of the invention as defined by the appended claims.

What is claimed is:

1. A chip type laminated capacitor, comprising:
   a ceramic body including a dielectric layer;
   first and second outer electrodes formed on ends of the ceramic body in a length direction;
   first and second band parts formed to extend inwardly in the length direction on a length-width (L-W) plane of the ceramic body from the first and second outer electrodes, respectively, the first and second band parts having different lengths; and
   third and fourth band parts formed to extend inwardly in the length direction on a length-thickness (L-T) plane of the ceramic body from the first and second outer electrodes, respectively, the third and fourth band parts having different lengths.

2. The chip type laminated capacitor of claim 1, wherein fifth and sixth band parts are formed on a surface of the ceramic body, opposed in a lamination direction to the surface on which the first and second band parts formed,
   seventh and eighth band parts are formed on a surface of the ceramic body, opposed in a width direction to the surface on which the third and fourth band parts formed, and
   the first to eighth band parts satisfy at least one of the following conditions (1), (2), (3), and (4):

$$3\% \leq BWave1/L \leq 40\% \quad (1)$$

$$3\% \leq BWave2/L \leq 40\% \quad (2)$$

$$3\% \leq BWave3/L \leq 40\% \quad (3), and$$

$$3\% \leq BWave4/L \leq 40\% \quad (4),$$

where BWave1 represents an average value of lengths A1 and A2 of the first and second band parts, BWave1=(A1+A2)/2, BWave2 represents an average value of lengths B1 and B2 of the third and fourth band parts, BWave2=(B1+B2)/2, BWave3 represents an average value of lengths C1 and C2 of the fifth and sixth band parts, BWave3=(C1+C2)/2, and BWave4 represents an average value of lengths D1 and D2 of the seventh and eighth band parts, BWave4=(D1+D2)/2, and A1 represents a length of the first band part, A2 represents a length of the second band part, B1 represents a length of the third band part, B2 represents a length of the fourth band part, C1 represents a length of the fifth band part, C2 represents a length of the sixth band part, D1 represents a length of the seventh band part, and D2 represents a length of the eighth band part.

3. The chip type laminated capacitor of claim 2, wherein an absolute value of a difference between the lengths of the band parts on one surface of the ceramic body and the BWave1 to the BWave4 satisfy at least one of the following conditions (5) to (8):

$$5\% \leq |A1-A2|/B\text{Wave1} \leq 20\% \quad (5)$$

$$5\% \leq |B1-B2|/B\text{Wave2} \leq 20\% \quad (6)$$

$$5\% \leq |C1-C2|/B\text{Wave3} \leq 20\% \quad (7), \text{and}$$

$$5\% \leq |D1-D2|/B\text{Wave4} \leq 20\% \quad (8)$$

where A1 represents the length of the first band part, A2 represents the length of the second band part, B1 represents the length of the third band part, B2 represents the length of the fourth band part, C1 represents the length of the fifth band part, C2 represents the length of the sixth band part, D1 represents the length of the seventh band part, and D2 represents the length of the eighth band part, wherein C1≠C2 and D1≠D2.

4. The chip type laminated capacitor of claim 1, wherein a thickness of the dielectric layer is 3 μm or less.

5. The chip type laminated capacitor of claim 1, wherein a thickness of the dielectric layer is equal to 10 or more times an average diameter of grains within the dielectric layer.

6. The chip type laminated capacitor of claim 1, wherein a thickness of the dielectric layer is 3 μm or less, and the thickness of the dielectric layer is equal to 10 or more times an average diameter of grains within the dielectric layer.

* * * * *